April 25, 1967

E. I. SAKASEGAWA 3,316,359

TRANSDUCER HEAD UTILIZING ELECTROMAGNETIC SHIELDING FOR CROSS-TALK ELIMINATION

Filed May 20, 1963

INVENTOR:
Eugene I. Sakasegawa

By Keith D. Beecher

Attorney 3,316,359

TRANSDUCER HEAD UTILIZING ELECTRO-MAGNETIC SHIELDING FOR CROSS-TALK ELIMINATION

Eugene I. Sakasegawa, Los Angeles, Calif., assignor to Winston Research Corporation, Los Angeles, Calif., a corporation of California Filed May 20, 1963, Ser. No. 281,637
5 Claims. (Cl. 179—100.2)

ABSTRACT OF THE DISCLOSURE

A new head construction using a plurality of core structures with metallic shielding between core structures and a plurality of terminal strips with terminal pins insulatedly mounted in the terminal strips. The terminal strips are soldered to the shields to achieve excellent magnetic isolation between magnetic core structures.

The present invention relates to electro-magnetic transducer heads; and it relates more particularly to an improved high-frequency, multi-element electro-magnetic record/reproduce head which is constructed so that cross-talk between the individual elements of the head is eliminated for all practical purposes.

It is usual in present day tape recorders to record information along the magnetic tape recording medium in a plurality of adjacent tracks. In order to record a maximum amount of information in a minimum amount of space, these tracks are of necessity extremely close to one another.

It is also usual to provide in the multi-track type of tape recorder, one or more multi-element read heads for sensing the recordings in the adjacent tracks and to provide independent electrical outputs corresponding to the information in the individual tracks.

Cross-talk between the elements of the multi-element read head has always been a problem. The present day systems in which high-frequency video information is recorded in a multi-track arrangement has aggravated this problem, because the signal interference tendencies between the channels increases at the higher frequencies.

It has been found that the present day type of multi-element electro-magnetic transducer head, although capable to all intents and purposes of avoiding cross-talk at the lower frequencies, is incapable of complete suppression of the cross-talk at the higher video frequencies.

The problem of cross-talk, outlined in the preceding paragraphs occurs when the multi-element transducers are used as reproduce heads to sense the recording on the multi-track tape; and the problem is also encountered when the transducers are used as record heads to record the information on the separate tracks.

It is an object of the present invention to provide an improved multi-element electro-magnetic transducer which is constructed so that cross-talk between the individual elements of the transducer is eliminated for all practical purposes, and throughout a wide range of frequencies.

Another object is to provide such an improved electro-magnetic transducer which is constructed to eliminate cross-talk even at the higher video frequencies recorded in many types of present day tape recorders.

A still further object of the invention is to provide such an improved electro-magnetic transducer which is constructed to eliminate cross-talk in a relatively simple and straightforward manner.

Other objects and advantages of the invention will become apparent from a consideration of the following description, when the description is taken in conjunction with the accompanying drawing, in which.

Figures 1, 2, 3, 4, 5, 6, 7, 8:
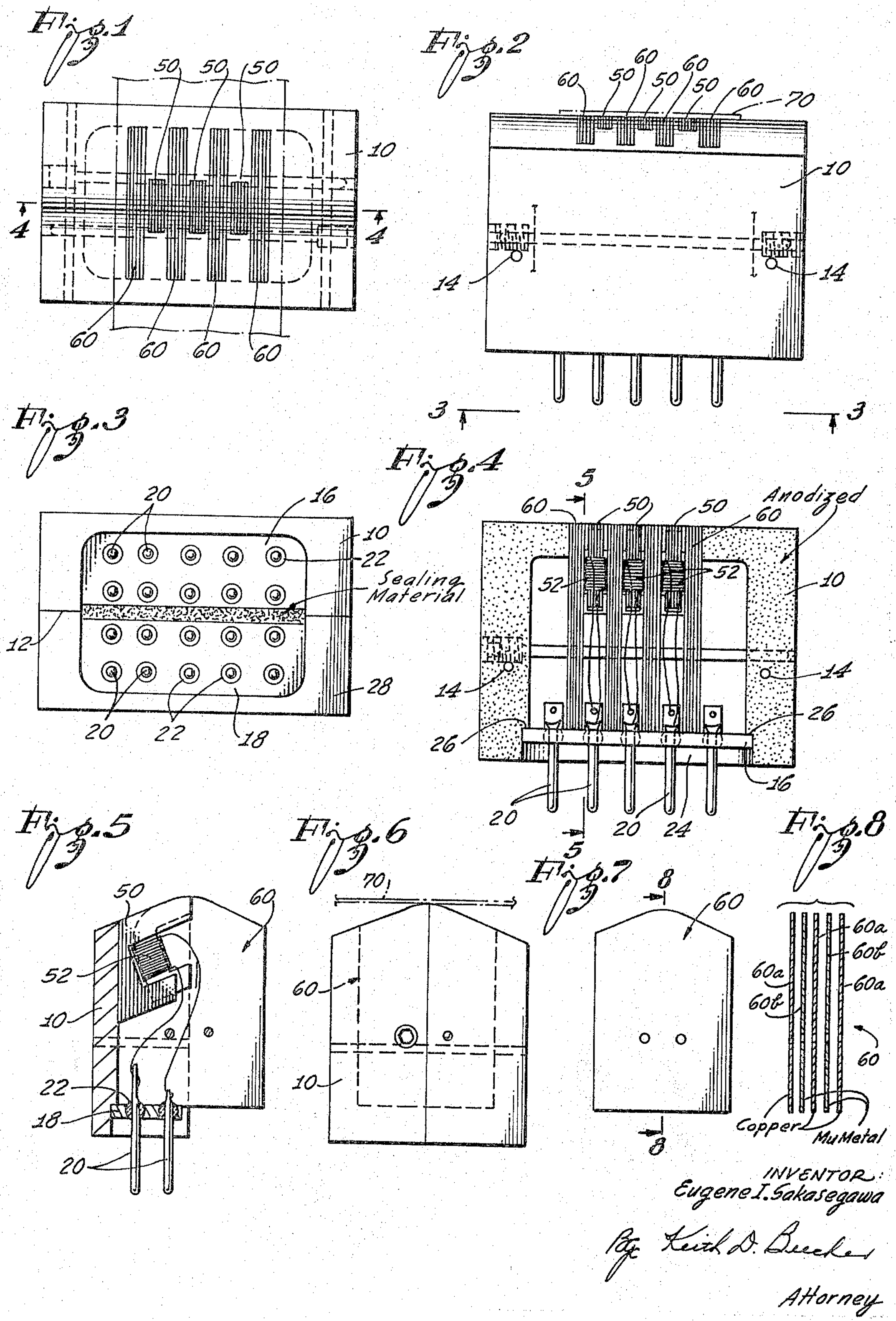
FIGURE 1 is a plan view of a multi-element electro-magnetic transducer constructed in accordance with one embodiment of the present invention.
FIGURE 2 is a side elevational view of the electro-magnetic transducer of FIGURE 1.
FIGURE 3 is a bottom view of the transducer, showing the manner in which the electrical terminal pins of the head are insulatingly supported in a pair of metallic terminal strips.
FIGURE 4 is a sectional view of the head of FIGURE 1, taken substantially on the line 4—4 of FIGURE 1, and illustrating the internal components of the transducer.
FIGURE 5 is an end view of the transducer, partly in section, and illustrating the manner in which an energizing winding is supported on the core of one of the individual transducer elements.
FIGURE 6 is an end view of the transducer, illustrating the manner in which a magnetic recording tape may be drawn across the sensitive face of the transducer.
FIGURE 7 is a side elevational view of a laminated composite electric-magnetic shield assembly, of the type used in the transducer under consideration.
FIGURE 8 is an expanded view of the various components which go to make up the shield of FIGURE 7, as will be described.

An electro-magnetic transducer constructed in accordance with one embodiment of the invention is illustrated in the drawing. The transducer is in the form of a head which includes a casing 10. The casing is formed, for example, of aluminum, or other suitable material.

The casing 10 is preferably in two parts, the parting line being designated 12, for example, in the view of FIGURE 3. The two parts of the casing 10 are held together, for example, by appropriate mounting screws which extend through apertures 14 (FIGURES 2 and 4). This construction of the casing permits it to be opened so as to reveal the internal components of the head, as shown in FIGURE 4.

Terminal pin supporting means, in the form of a pair of metallic terminal strips 16 and 18, are mounted on the lower side of the casing 10. A plurality of electrically conductive terminal pins 20 extend through the terminal strips 16 and 18. These pins are mounted on the terminal strips in mutually insulated relationship by means of a plurality of glass beads 22. The glass beads are sealed to the terminal strips and to respective ones of the terminal pins. The strips 16 and 18 are formed, for example, of soft steel, with an electroplated gold coating on their external surfaces.

The use of the metallic terminal strips 16 and 18 provides a low dielectric shield between the terminal pins. This assures that electrical leakage between the terminal pins at the higher video frequencies will be reduced to a minimum. The strips 16 and 18 are grounded. In the electro-magnetic transducer under consideration, an electrical grounding path is provided for the terminal strips 16 and 18 through the casing 10.

The casing is preferably anodized, so as to render it nonconductive. However, the lower under-cut portion 24 of the casing, which receives the metallic terminal strips 16 and 18, and the shoulders 26 against which the strips are positioned, are not anodized so as to be electrically conductive. Also, the bottom surface 28 of the casing is not anodized so as to be electrically conductive. This permits electric grounding paths to be established from the chassis on which the casing 10 is mounted to the terminal strips 16 and 18, so that the strips may function effectively as electric shields.

As mentioned above, the electro-magnetic transducer head with which the present invention is concerned is of the multi-element type. The illustrated head includes a plurality of magnetic cores 50 which are mounted in the casing 10 in positions spaced from one another. The cores 50 protrude through the upper face of the casing 10 and present air gaps at the upper face. The multi-track tape 70 (FIGURE 6) is drawn across the upper face of the head, in known manner, so that the protruding portions of the cores 50, and the respective air gaps, may engage and be magnetically coupled to the different tracks of the tape.

Corresponding energizing coils 52 are wound around the cores 50 in magnetically coupled relationship with the cover, as best shown in FIGURES 4 and 5. These energizing coils are connected to respective ones of the terminal pins 20, as shown, for example, in FIGURE 5.

To eliminate any cross-talk between the magnetic cores 50, and between the energizing coils 52, a plurality of shields 60 are inserted in slots in the casing 10, and these shields extend completely across the interior of the casing and down from the top to the terminal strips 16 and 18.

As shown in FIGURE 4, the shields 60 extend down into engagement with the metallic terminal strips 16 and 18 between respective pairs of the terminal pins 20. The strips 16 and 18 are spaced from one another, as shown in FIGURE 3, and the shields 60 may be conveniently affixed to the strips 16 and 18 by the provision of solder in the space between the strips.

It will be appreciated that in the resulting assembly, each of the individual cores 50, and its associated energizing coil 52, is completely enclosed in a compartment formed by the adjacent shields 60, and by the metallic terminal strips 16 and 18.

The shields 60 are formed, for example, of a plurality of laminations **60*a* and 60*b*, as shown in the separated view of FIGURE 8. These laminations provide magnetic and electric shielding. For this purpose, the electric shield laminations 60*a* may be formed, for example, of copper, and the magnetic shield laminations 60*b*** may be formed of mu metal.

The construction of the electro-magnetic transducer head of the invention, as described above, permits the head to be made to extremely small dimensions, and yet provide for a complete enclosure of each of the separate individual core elements.

The electro-magnetic transducer head of the invention has been found to operate with a high degree of efficiency, both for recording and reproducing, and effective shielding is provided therein even for the video frequency signals in the higher ranges.

While a particular embodiment of the invention has been disclosed, modifications may be made. It is intended in the following claims to cover all modifications which fall within the scope of the invention.

What is claimed is:

1. A transducer head including: a casing; a plurality of magnetic core structures mounted in said casing and spaced from one another; a corresponding plurality of energizing coils mounted in magnetically coupled relationship with respective ones of said core structures; metallic terminal supporting means including first and second terminal strips spaced from one another mounted in said casing; a plurality of electrically conductive terminal pins extending through said terminal supporting means and connected to respective ones of said coils; insulating means for mounting said terminal pins on said terminal supporting means in mutually insulated relationship; a plurality of shields extending across said casing between adjacent ones of said core structures and into engagement and electrical contact with said terminal supporting means; and soldering means disposed in the space between said strips for attaching said shields to said strips in electrical contact therewith.

2. The transducer head defined in claim 1 in which said shields each comprise laminations of magnetic and electric shielding material.

3. The transducer head defined in claim 1 in which said shields each comprise laminations of copper and of mu metal.

4. The transducer head defined in claim 1 in which the surface of said casing is anodized to form a non-conductive surface, and the portion of said casing in engagement with said terminal supporting means and adjacent thereto is electrically conductive to establish an electrically conductive path to said terminal supporting means.

5. The transducer head defined in claim 1 in which said terminal supporting means includes a pair of metallic strip members formed of gold plated soft steel.

References Cited by the Examiner

UNITED STATES PATENTS

| | | | |
|---|---|---|---|
| 2,263,485 | 11/1941 | Clopton | 179—100.2 |
| 2,769,036 | 10/1956 | Selsted | 179—100.2 |
| 3,037,089 | 5/1962 | Warren | 179—100.2 |

BERNARD KONICK, *Primary Examiner.*

L. G. KURLAND, *Assistant Examiner.*